(12) United States Patent
Garcia

(10) Patent No.: US 11,732,825 B1
(45) Date of Patent: Aug. 22, 2023

(54) SWIVELING HOSE COUPLER ASSEMBLY

(71) Applicant: Michael Garcia, Deming, NM (US)

(72) Inventor: Michael Garcia, Deming, NM (US)

( * ) Notice: Subject to any disclaimer, the term of this patent is extended or adjusted under 35 U.S.C. 154(b) by 0 days.

(21) Appl. No.: 17/676,347

(22) Filed: Feb. 21, 2022

(51) Int. Cl.
*F16L 27/08* (2006.01)
*F16L 33/30* (2006.01)
*F16L 31/00* (2006.01)

(52) U.S. Cl.
CPC .......... *F16L 27/0828* (2013.01); *F16L 31/00* (2013.01); *F16L 33/30* (2013.01)

(58) Field of Classification Search
CPC ... F16L 33/30; F16L 27/0824; F16L 27/0828; F16L 31/00; F16L 47/18
See application file for complete search history.

(56) References Cited

U.S. PATENT DOCUMENTS

| | | | |
|---|---|---|---|
| 883,941 A * | 4/1908 | Eagan | F16L 27/0828 |
| 1,888,741 A * | 11/1932 | Schellin | F16L 31/00 |
| 1,994,784 A * | 3/1935 | Porzel | F16L 31/00 |
| 2,273,396 A | 2/1942 | Gouty | |
| 4,875,718 A | 10/1989 | Marker | |
| 6,158,784 A * | 12/2000 | Lavender | F16L 33/30 |
| 6,220,636 B1 | 4/2001 | Velosky | |
| 6,733,046 B1 | 5/2004 | Rief | |
| 7,108,292 B2 | 9/2006 | Lipscomb | |
| D642,246 S | 7/2011 | Mezzalira | |
| 11,143,336 B1 * | 10/2021 | DuPont, Jr. | F16L 33/30 |
| 2013/0134699 A1 * | 5/2013 | Esders | F16L 31/00 |
| 2014/0318664 A1 | 10/2014 | Mayher | |
| 2015/0292664 A1 * | 10/2015 | Mann | F16L 47/18 |

FOREIGN PATENT DOCUMENTS

WO WO2014143742 9/2014

* cited by examiner

*Primary Examiner* — Zachary T Dragicevich

(57) ABSTRACT

A swiveling hose coupler assembly for inhibiting hoses from becoming kinked includes a first male fitting that is insertable into a female end of a first hose. The first male fitting is hollow to pass a fluid from the first hose outwardly through the male fitting. A second male fitting is rotatably coupled to the first male fitting such that each of the first male fitting and the second male fitting extends along a common axis, and the second male fitting is rotatable about the common axis. The second male fitting is insertable into a female end of a second hose to inhibit the first hose and the second hose from becoming kinked. The second male fitting is hollow to pass the fluid from the first male fitting into the second hose.

12 Claims, 5 Drawing Sheets

SWIVELING HOSE COUPLER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hose coupler devices and more particularly pertains to a new hose coupler device for inhibiting hoses from becoming kinked. The device includes a first male fitting and a second male fitting that is rotatably coupled to the first male fitting. The first male fitting is insertable into a first hose and the second male fitting is insertable into a second hose. In this way the first hose and the second hose can be deployed without kinking.

(2) Description of Related Art Including Information Disclosed Under 37 CFR 1.97 and 1.98

The prior art relates to hose coupler devices including a swiveling hose fitting which includes a first fitting threadably engaging a second fitting and a metal sleeve extending through the first fitting and the second fitting. The prior art discloses a swivel joint comprising a ball and a socket. The prior art discloses a swivel joint for a pool cleaner hose. The prior art discloses a swiveling hose connection which comprises a pair of female hose couplers that are rotatably coupled together with ball bearings. The prior art discloses a swiveling hose connection which comprises a female hose coupler that is rotatably coupled to a male hose coupler with ball bearings. The prior art discloses a kink inhibiting fitting which has a first half that rotatably engages a second half and a pair of hoses which is each attachable to a respective first half and second half.

BRIEF SUMMARY OF THE INVENTION

An embodiment of the disclosure meets the needs presented above by generally comprising a first male fitting that is insertable into a female end of a first hose. The first male fitting is hollow to pass a fluid from the first hose outwardly through the male fitting. A second male fitting is rotatably coupled to the first male fitting such that each of the first male fitting and the second male fitting extends along a common axis, and the second male fitting is rotatable about the common axis. The second male fitting is insertable into a female end of a second hose to inhibit the first hose and the second hose from becoming kinked. The second male fitting is hollow to pass the fluid from the first male fitting into the second hose.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
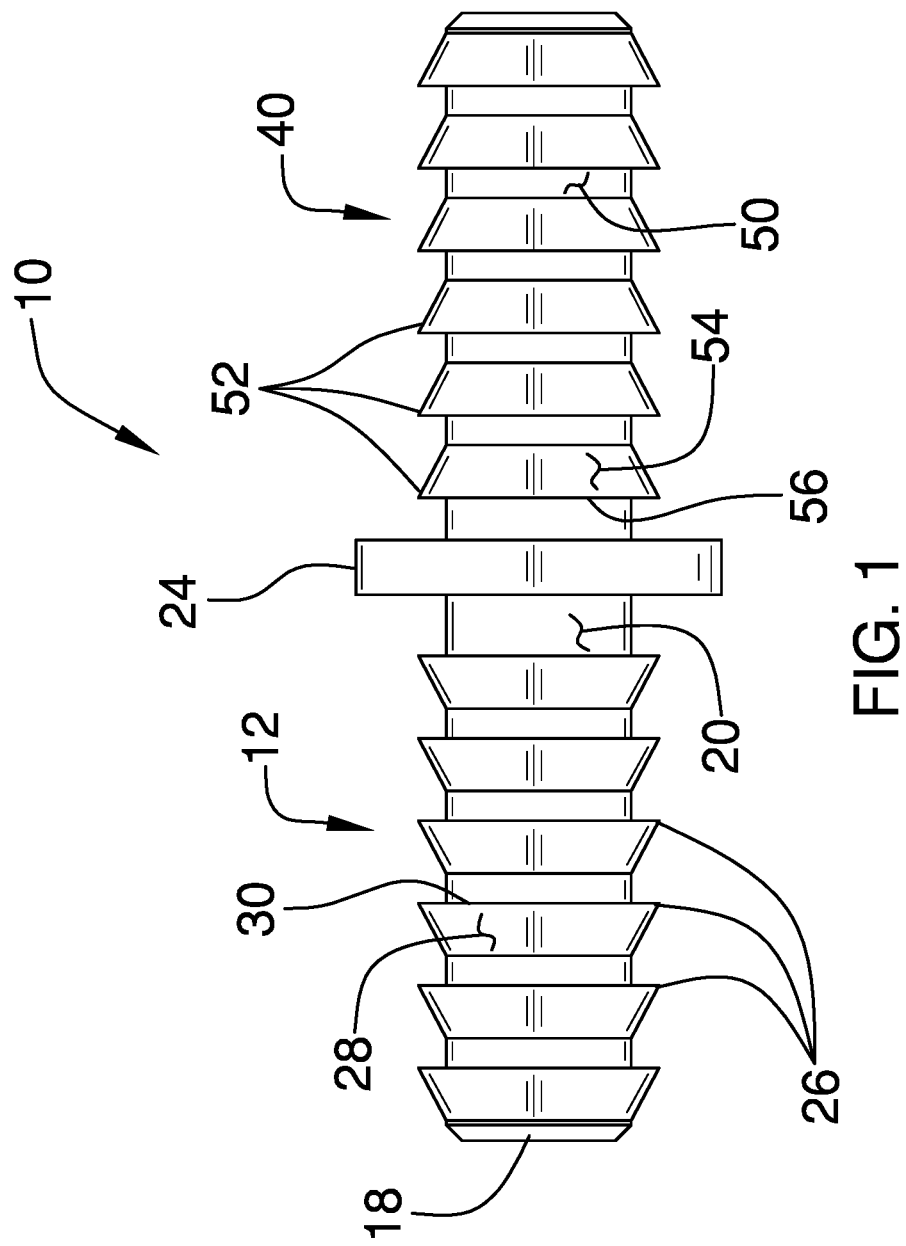
FIG. 1 is a top view of a swiveling hose coupler assembly according to an embodiment of the disclosure.
Figure 2:
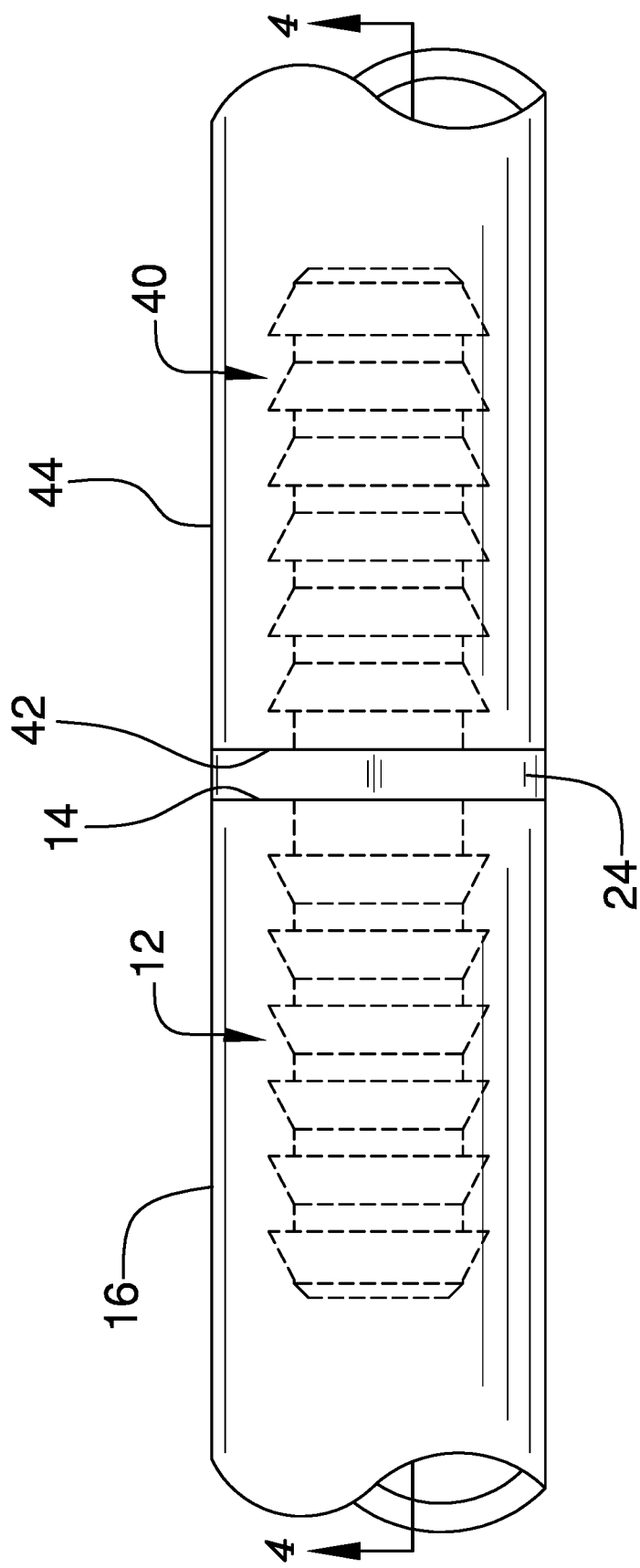
FIG. 2 is a phantom in-use view of an embodiment of the disclosure.
Figure 3:
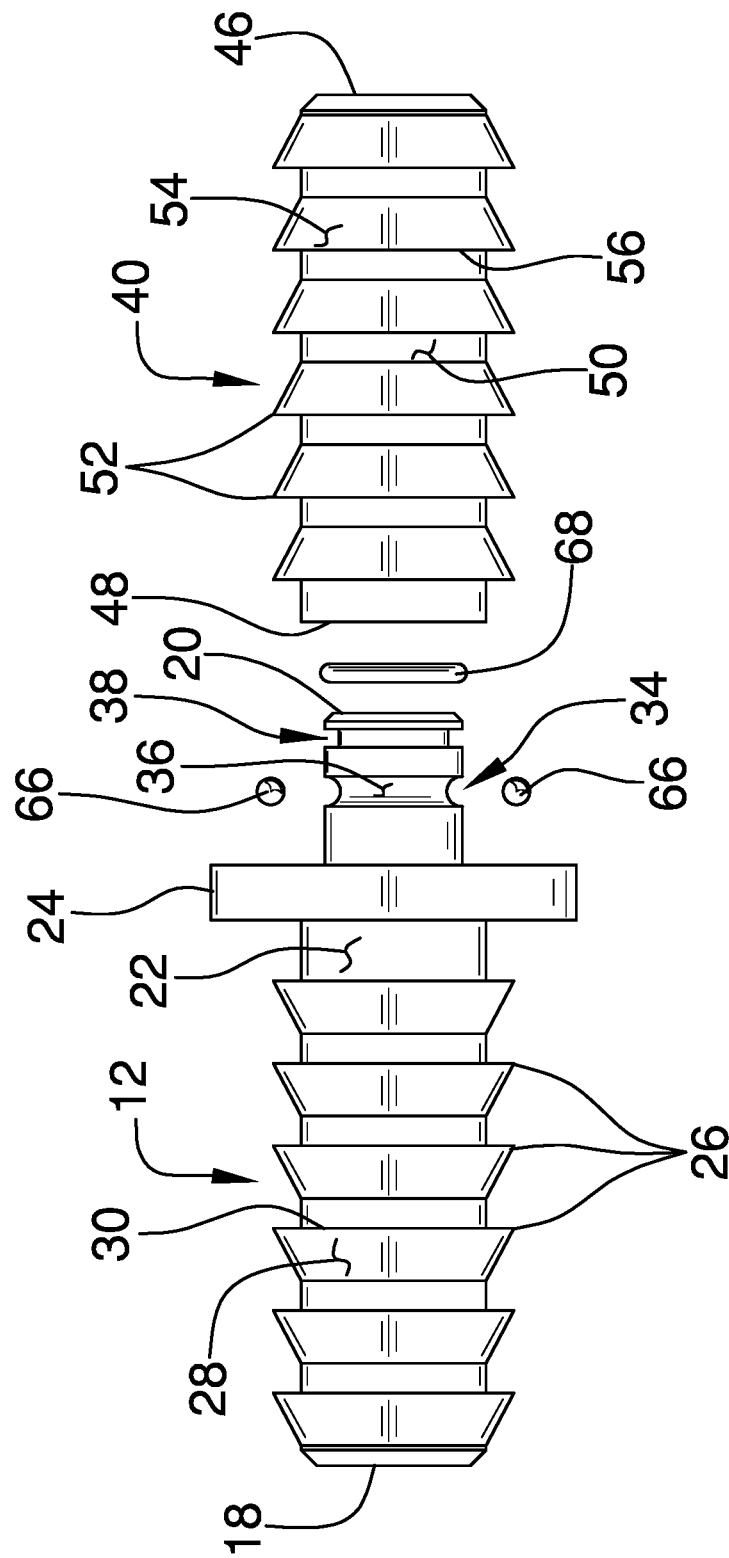
FIG. 3 is an exploded perspective view of an embodiment of the disclosure.
Figure 4:
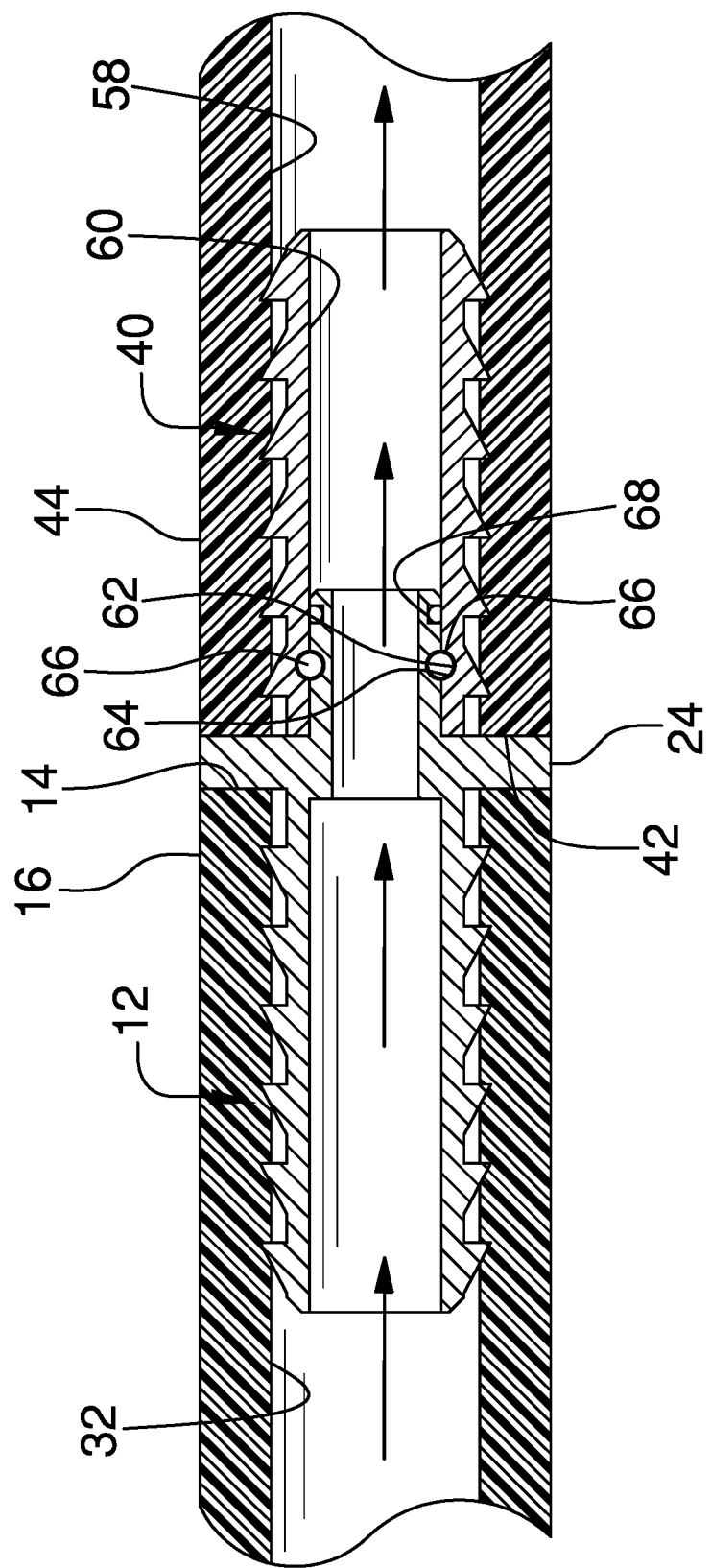
FIG. 4 is a cross sectional view taken along line 4-4 of FIG. 2 of an embodiment of the disclosure.
Figure 5:
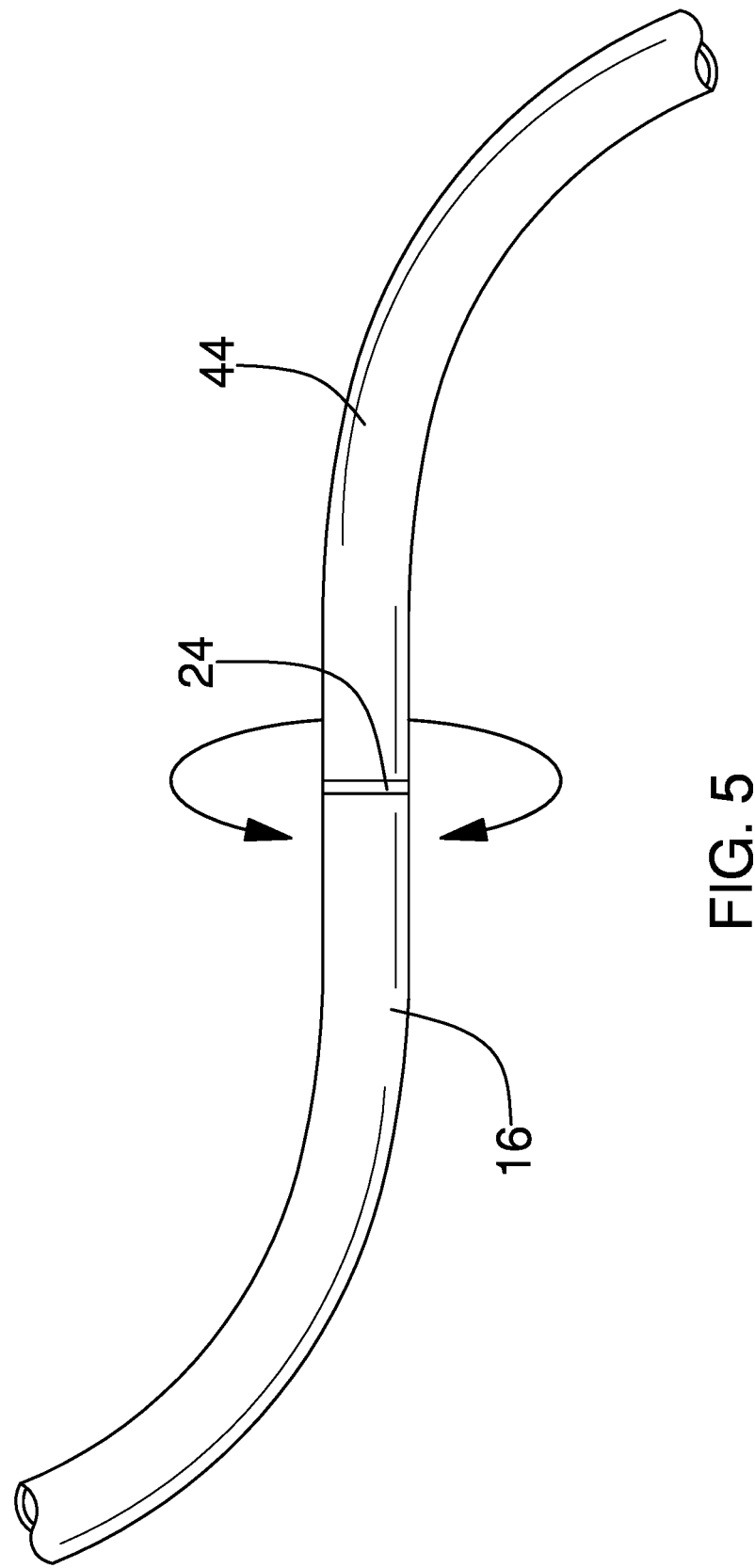
FIG. 5 is a perspective in-use view of an embodiment of the disclosure.

With reference now to the drawings, and in particular to FIGS. 1 through 5 thereof, a new hose coupler device embodying the principles and concepts of an embodiment of the disclosure and generally designated by the reference numeral 10 will be described.

As best illustrated in FIGS. 1 through 5, the swiveling hose coupler assembly 10 generally comprises a first male fitting 12 that is insertable into a female end 14 of a first hose 16. The first male fitting 12 is hollow to pass a fluid from the first hose 16 outwardly through the first male fitting 12. The first male fitting 12 has a first end 18, a second end 20 and an outer surface 22 extending between the first end 18 and the second end 20, and the first male fitting 12 is elongated between the first end 18 and the second end 20. The outer surface 22 is continuously arcuate about an axis extending between the first end 18 and the second end 20 such that the first male fitting 12 has a tubular shape, and each of the first end 18 and the second end 20 is open. The first male fitting 12 may be comprised of brass or other rigid, corrosion resistant material.

The first male fitting 12 has a shoulder 24 extending outwardly from the outer surface 22 and the shoulder 24 extends around a full circumference of the outer surface 22. The shoulder 24 is positioned closer to the second end 20 than the first end 18, and the outer surface 22 between the shoulder 24 and the second end 20 has a diameter is less than a diameter of the outer surface 22 between the shoulder 24 and the first end 18. The outer surface 22 has a plurality of first ridges 26 each extending around a full circumference of the outer surface 22. The first ridges 26 are spaced apart from each other and are distributed between the shoulder 24 and the first end 18 of the first male fitting 12. Each of the first ridges 26 has a sloped surface 28 angling away from the outer surface 22 and a vertical surface 30 extending between the sloped surface 38 and the outer surface 22. The sloped surface 28 of each of the first ridges 26 slopes upwardly between the first end 18 of the first male fitting 12 and the shoulder 24 such that an intersection between the sloped surface 28 and the vertical surface 30 frictionally engages an interior surface 32 of the first hose 16 to inhibit the first male fitting 12 from being removed from the first hose 16. Additionally, the first male fitting 12 is inserted into the female end 14 of the first hose 16 until the female end 14 of the first hose 16 abuts the shoulder 24.

The outer surface 22 has a first groove 34 extending around a full circumference of the outer surface 22. The first groove 34 is positioned between the shoulder 24 and the second end 20 of the first male fitting 12. Continuing, the first groove 34 has a bounding surface 36 and the bounding surface 36 is concavely arcuate with respect to the outer surface 22. The outer surface 22 has a second groove 38 extending around a full circumference of the outer surface 22. Additionally, the second groove 38 is positioned between the first groove 34 and the second end 20.

A second male fitting 40 is rotatably coupled to the first male fitting 12 such that each of the first male fitting 12 and the second male fitting 40 extends along a common axis. Additionally, the second male fitting 40 is rotatable about the common axis. The second male fitting 40 is insertable into a female end 42 of a second hose 44 thereby rotatably attaching the first hose 16 to the second hose 44. In this way the first male fitting 12 and the second male fitting 40 inhibit the first hose 16 and the second hose 44 from becoming kinked. The second male fitting 40 is hollow to pass the fluid from the first male fitting 12 in the second hose 44. Additionally, the second male fitting 40 may be comprised of brass or other rigid, corrosion resistant material. Each of the first hose 16 and the second hose 44 may comprise sections of a garden hose or other type of low pressure fluid hose.

The second male fitting 40 has a primary end 46, a secondary end 48 and an outside surface 50 extending between the primary end 46 and the secondary end 48, and the second male fitting 40 is elongated between the primary end 46 and the secondary end 48. The outside surface 50 is continuously arcuate about an axis extending through the primary end 46 and the secondary end 48 such that the second male fitting 40 has a tubular shape, and each of the primary end 46 and the secondary end 48 is open. The outside surface 50 has a plurality of second ridges 52 each extending around a full circumference of the outer surface 22. The second ridges 52 are spaced apart from each other and are distributed between the primary end 46 and the secondary end 48 of the second male fitting 40. Each of the second ridges 52 has a sloped surface 54 angling away from the outside surface 50 and a vertical surface 56 extending between the sloped surface 54 and the outside surface 50. The sloped surface 54 of each of the second ridges 52 slopes upwardly between the primary end 46 and the secondary end 48 such that an intersection between the sloped surface 54 and the vertical surface 56 of the second ridges 52 frictionally engages an interior surface 58 of the second hose 44 to inhibit the second male fitting 40 from being removed from the second hose 44.

The second male fitting 40 has an inside surface 60 and the inside surface 60 has a third groove 62 extending around a full circumference of the inside surface 60. The third groove 62 is positioned closer to the secondary end 48 than the primary end 46. The third groove 62 has a bounding surface 64 and the bounding surface 64 of the third groove 62 is concavely arcuate with respect to the inside surface 60. The third groove 62 is aligned with the first groove 34 in the outer surface 22 of the first male fitting 12 when secondary end 48 insertably receives the second end 20 of the first male fitting 12. Furthermore, the secondary end 48 of the second male fitting 40 abuts the shoulder 24 when the second male fitting 40 is fully seated on the first male fitting 12.

A plurality of ball bearings 66 is each positioned in the first groove 34 and the third groove 62 for retaining the second male fitting 40 on the first male fitting 12. A gasket 68 is provided which forms a closed loop and the gasket 68 is positioned in the second groove 38 such that the gasket 68 extends outwardly beyond the outer surface 22 of the first male fitting 12. The gasket 68 engages the inside surface 60 of the second male fitting 40 when the second male fitting 40 is fully seated on the first male fitting 12. Additionally, the gasket 68 is comprised of a resiliently compressible material such that the gasket 68 forms a fluid impermeable seal with the inside surface 60 of the second male fitting 40. In this way the gasket 68 inhibits fluid from leaking outwardly from the secondary end 48 of the second male fitting 40.

In use, the first male fitting 12 is inserted into the female end 14 of the first hose 16 until the first hose 16 abuts the shoulder 24. The second male fitting 40 is inserted into the female end 42 of the second hose 44 until the second hose 44 abuts the shoulder 24. In this way the first hose 16 is rotatably coupled to the second hose 44. Thus, the first hose 16 and the second hose 44 can be deployed without kinking as is common in lengths of garden hose, for example. Furthermore, the first male fitting 12 and the second male fitting 40 facilitate a water tight seal between the first hose 16 and the second hose 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A swiveling hose coupler assembly for attaching two hoses together in a swiveling manner, said assembly comprising:

a first male fitting being insertable into a female end of a first hose, said first male fitting being hollow wherein said first male fitting is configured to pass a fluid from the first hose outwardly through said male fitting; and a second male fitting being rotatably coupled to said first male fitting such that each of said first male fitting and said second male fitting extends along a common axis, said second male fitting being rotatable about said common axis, said second male fitting being insertable into a female end of a second hose thereby rotatably attaching the first hose to the second hose wherein said first male fitting and said second male fitting are configured to inhibit the first hose and the second hose from becoming kinked, said second male fitting being hollow wherein said second male fitting is configured to pass the fluid from said first male fitting into the second hose;

wherein said second male fitting has a primary end, a secondary end and an outside surface extending between said primary end and said secondary end, said second male fitting being elongated between said primary end and said secondary end, said outside surface being continuously arcuate about an axis extending through said primary end and said secondary end such that said second male fitting has a tubular shape, each of said primary end and said secondary end being open;

wherein an outer surface of said first male fitting has a plurality of first ridges;

wherein said outside surface has a plurality of second ridges each extending around a full circumference of said outer surface, said second ridges being spaced apart from each other and being distributed between said primary end and said secondary end of said second male fitting, each of said second ridges having a sloped surface angling away from said outside surface and a vertical surface extending between said sloped surface and said outside surface, said sloped surface of each of said second ridges sloping upwardly between said primary end and said secondary end such that an intersection between said sloped surface and said vertical surface frictionally engages an interior surface of the second hose to inhibit said second male fitting from being removed from the second hose;

wherein said second male fitting has an inside surface, said inside surface having a third groove extending around a full circumference of said inside surface, said third groove being positioned closer to said secondary end than said primary end, said third groove having a bounding surface, said bounding surface of said third groove being concavely arcuate with respect to said inside surface, said third groove being aligned with said first groove in said outer surface of said first male fitting when secondary end insertably receives said second end of said first male fitting;

wherein said first male fitting has a first groove being recessed into an outer surface of said first male fitting, said outer surface having a second groove; and wherein said assembly includes a plurality of ball bearings, each of said ball bearings being positioned in said first groove and said third groove for retaining said second fitting on said first fitting.

2. The assembly according to claim 1, wherein said first male fitting has a first end, a second end and an outer surface extending between said first end and said second end, said first male fitting being elongated between said first end and said second end, said outer surface being continuously arcuate about an axis extending between said first end and said second end such that said first male fitting has a tubular shape, each of said first end and said second end being open.

3. The assembly according to claim 2, wherein:

said first male fitting has a shoulder extending outwardly from said outer surface, said shoulder extending around a full circumference of said outer surface, said shoulder being positioned closer to said second end than said first end; and said outer surface between said shoulder and said second end has a diameter being less than a diameter of said outer surface between said shoulder and said first end.

4. The assembly according to claim 3, wherein said outer surface has a plurality of first ridges each extending around a full circumference of said outer surface, said first ridges being spaced apart from each other and being distributed between said shoulder and said first end of said first male fitting.

5. The assembly according to claim 4, wherein each of said first ridges has a sloped surface angling away from said outer surface and a vertical surface extending between said sloped surface and said outer surface, said sloped surface of each of said first ridges sloping upwardly between said first end of said first male fitting and said shoulder such that an intersection between said sloped surface and said vertical surface frictionally engages an interior surface of the first hose to inhibit said first male fitting from being removed from the first hose.

6. The assembly according to claim 3, wherein said first male fitting is inserted into the female end of the first hose until the female end of the first hose abuts said shoulder.

7. The assembly according to claim 3, wherein said outer surface has a first groove extending around a full circumference of said outer surface, said first groove being positioned between said shoulder and said second end of said first male fitting, said first groove having a bounding surface, said bounding surface being concavely arcuate with respect to said outer surface.

8. The assembly according to claim 7, Wherein said outer surface has a second groove extending around a full circumference of said outer surface, said second groove being positioned between said first groove and said second end.

9. The assembly according to claim 1, wherein:

said first male fitting has a shoulder; and said secondary end of said second male fitting abuts said shoulder when said second male fitting is fully seated on said first male fitting.

10. The assembly according to claim 1, further comprising a gasket forming a closed loop, said gasket being positioned in said second groove such that said gasket extends outwardly beyond said outer surface of said first male fitting, said gasket engaging said inside surface of said second male fitting when said second male fitting is fully seated on said first male fitting.

11. The assembly according to claim 10, wherein said gasket is comprised of a resiliently compressible material such that said gasket forms a fluid impermeable seal with said inside surface of said second male fitting wherein said gasket is configured to inhibit fluid from leaking outwardly from said secondary end of said second male fitting.

12. A swiveling hose coupler assembly for attaching two hoses together in a swiveling manner, said assembly comprising:

a first male fitting being insertable into a female end of a first hose, said first male fitting being hollow wherein said first male fitting is configured to pass a fluid from the first hose outwardly through said male fitting, said first male fitting having a first end, a second end and an outer surface extending between said first end and said second end, said first male fitting being elongated between said first end and said second end, said outer surface being continuously arcuate about an axis extending between said first end and said second end such that said first male fitting has a tubular shape, each of said first end and said second end being open, said first male fitting having a shoulder extending outwardly from said outer surface, said shoulder extending around a full circumference of said outer surface, said shoulder being positioned closer to said second end than said first end, said outer surface between said shoulder and said second end having a diameter being less than a diameter of said outer surface between said shoulder and said first end, said outer surface having a plurality of first ridges each extending around a full circumference of said outer surface, said first ridges being spaced apart from each other and being distributed between said shoulder and said first end of said first male fitting, each of said first ridges having a sloped surface angling away from said outer surface and a vertical surface extending between said sloped surface and said outer surface, said sloped surface of each of said first ridges sloping upwardly between said first end of said first male fitting and said shoulder such that an intersection between said sloped surface and said vertical surface frictionally engages an interior surface of the first hose to inhibit said first male fitting from being removed from the first hose, said first male fitting being inserted into the female end of the first hose until the female end of the first hose abuts said shoulder, said outer surface having a first groove extending around a full circumference of said outer surface, said first groove being positioned between said shoulder and said second end of said first male fitting, said first groove having a bounding surface, said bounding surface being concavely arcuate with respect to said outer surface, said outer surface having a second groove extending around a full circumference of said outer surface, said second groove being positioned between said first groove and said second end;

a second male fitting being rotatably coupled to said first male fitting such that each of said first male fitting and said second male fitting extends along a common axis, said second male fitting being rotatable about said common axis, said second male fitting being insertable into a female end of a second hose thereby rotatably attaching the first hose to the second hose wherein said first male fitting and said second male fitting are configured to inhibit the first hose and the second hose from becoming kinked, said second male fitting being hollow wherein said second male fitting is configured to pass the fluid from said first male fitting in the second hose, said second male fitting having a primary end, a secondary end and an outside surface extending between said primary end and said secondary end, said second male fitting being elongated between said primary end and said secondary end, said outside surface being continuously arcuate about an axis extending through said primary end and said secondary end such that said second male fitting has a tubular shape, each of said primary end and said secondary end being open, said outside surface having a plurality of second ridges each extending around a full circumference of said outer surface, said second ridges being spaced apart from each other and being distributed between said primary end and said secondary end of said second male fitting, each of said second ridges having a sloped surface angling away from said outside surface and a vertical surface extending between said sloped surface and said outside surface, said sloped surface of each of said second ridges sloping upwardly between said primary end and said secondary end such that an intersection between said sloped surface and said vertical surface frictionally engages an interior surface of the second hose to inhibit said second male fitting from being removed from the second hose, said second male fitting having an inside surface, said inside surface having a third groove extending around a full circumference of said inside surface, said third groove being positioned closer to said secondary end than said primary end, said third groove having a bounding surface, said bounding surface of said third groove being concavely arcuate with respect to said inside surface, said third groove being aligned with said first groove in said outer surface of said first male fitting when secondary end insertably receives said second end of said first male fitting, said secondary end of said second male fitting abutting said shoulder when said second male fitting is fully seated on said first male fitting;

a plurality of ball bearings, each of said ball bearings being positioned in said first groove and said third groove for retaining said second fitting on said first fitting; and a gasket forming a closed loop, said gasket being positioned in said second groove such that said gasket extends outwardly beyond said outer surface of said first male fitting, said gasket engaging said inside surface of said second male fitting when said second male fitting is fully seated on said first male fitting, said gasket being comprised of a resiliently compressible material such that said gasket forms a fluid impermeable seal with said inside surface of said second male fitting wherein said gasket is configured to inhibit fluid from leaking outwardly from said secondary end of said second male fitting.

* * * * *